US010979505B1

United States Patent
Sakashita et al.

(10) Patent No.: US 10,979,505 B1
(45) Date of Patent: Apr. 13, 2021

(54) DISTRIBUTED STORAGE SYSTEM AND DATA MIGRATION METHOD

(71) Applicant: HITACHI, LTD., Tokyo (JP)

(72) Inventors: Yuki Sakashita, Tokyo (JP); Hideo Saito, Tokyo (JP); Takaki Nakamura, Tokyo (JP); Akiyoshi Tsuchiya, Tokyo (JP); Tsukasa Shibayama, Tokyo (JP); Azusa Jin, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/815,826

(22) Filed: Mar. 11, 2020

(30) Foreign Application Priority Data

Oct. 2, 2019 (JP) .............................. JP2019-181872

(51) Int. Cl.
    *G06F 15/173*      (2006.01)
    *H04L 29/08*      (2006.01)
    *H04L 12/26*      (2006.01)

(52) U.S. Cl.
    CPC .......... *H04L 67/1097* (2013.01); *H04L 43/08* (2013.01)

(58) Field of Classification Search
    CPC ............................ H04L 67/1097; H04L 43/08
    USPC ........................................................ 709/224
    See application file for complete search history.

(56) References Cited

U.S. PATENT DOCUMENTS

| | | | | |
|---|---|---|---|---|
| 8,935,500 | B1* | 1/2015 | Gulati | ................. G06F 11/3433 711/165 |
| 9,563,479 | B2* | 2/2017 | Ferris | ..................... G06F 9/5072 |
| 2011/0219118 | A1* | 9/2011 | Cowan | ..................... H04L 43/04 709/224 |
| 2013/0232261 | A1* | 9/2013 | Wright | ................ H04L 41/5022 709/224 |
| 2014/0173232 | A1* | 6/2014 | Reohr | ................. H04L 67/1097 711/162 |
| 2015/0067171 | A1* | 3/2015 | Yum | .................... H04L 67/2809 709/226 |

FOREIGN PATENT DOCUMENTS

JP      2014178975 A      9/2014

\* cited by examiner

*Primary Examiner* — Atta Khan
(74) *Attorney, Agent, or Firm* — Procopio, Cory, Hargreaves & Savitch LLP

(57) ABSTRACT

A highly accurate data migration pattern is decided on the bases of usages of a plurality of kinds of resources and by taking influence of execution of data migration on each resource into consideration.

In a distributed storage system, a monitor acquires a per-period usage of each of the plurality of kinds of the resources per data, a performance simulator estimates a per-period usage of each resource on a migration destination node when the data is migrated by using the acquired per-data resource usage and calculates an estimate of a latency from the estimated usage of each resource and an optimizer decides a migration pattern of the data on the basis of the estimate of the latency.

10 Claims, 22 Drawing Sheets

FIG. 6

| SERVER MODEL | THE NUM. OF SERVERS |
|---|---|
| HA8000V | 4 |

SYSTEM CONFIGURATION TABLE

FIG. 7

NODE CONFIGURATION TABLE 121

| STORAGE NODE ID (1211) | PROCESSOR FREQ. [GHz] (1212) | NUM. OF PROCESSORS (1213) | MEMORY [GB] (1214) | BANDWIDTH OF INTERNODE NW [Gbps] (1215) | BANDWIDTH OF COMPUTE NW [Gbps] (1216) | NUM. OF DRIVES (1217) | TOTAL CAPACITY [GB] (1218) | USED CAPACITY [GB] (1219) |
|---|---|---|---|---|---|---|---|---|
| aaaaaaaa-bbbb-cccc-dddd-eeeeeeeeeeee | 2.2 | 16 | 256 | 10 | 10 | 4 | 3,200 | 2,600 |
| bbbbbbbb-cccc-dddd-eeee-ffffffffffff | 2.2 | 16 | 256 | 10 | 10 | 4 | 3,200 | 2,400 |
| cccccccc-dddd-eeee-ffff-000000000000 | 2.2 | 16 | 256 | 10 | 10 | 4 | 3,200 | 1,200 |
| dddddddd-eeee-ffff-0000-111111111111 | 2.2 | 16 | 256 | 10 | 10 | 4 | 3,200 | 1,000 |

FIG. 8

| VOLUME ID | USED CAPACITY [MiB] | STORAGE NODE ID |
|---|---|---|
| 11111111-2222-3333-4444-555555555555 | 100,000 | aaaaaaaa-bbbb-cccc-dddd-eeeeeeeeeeee |
| 22222222-3333-4444-5555-666666666666 | 100,000 | bbbbbbbb-cccc-dddd-eeee-ffffffffffff |
| 33333333-4444-5555-6666-777777777777 | 100,000 | cccccccc-dddd-eeee-ffff-000000000000 |
| 44444444-5555-6666-7777-888888888888 | 100,000 | dddddddd-eeee-ffff-0000-111111111111 |
| 55555555-6666-7777-8888-999999999999 | 100,000 | aaaaaaaa-bbbb-cccc-dddd-eeeeeeeeeeee |
| 66666666-7777-8888-9999-aaaaaaaaaaaa | 100,000 | bbbbbbbb-cccc-dddd-eeee-ffffffffffff |
| 77777777-8888-9999-aaaa-bbbbbbbbbbbb | 100,000 | cccccccc-dddd-eeee-ffff-000000000000 |
| 88888888-9999-aaaa-bbbb-cccccccccccc | 100,000 | dddddddd-eeee-ffff-0000-111111111111 |

VOLUME PLACEMENT TABLE

FIG. 10

| TIME STAMP | VOLUME ID | RANDOM RATIO [%] | AVERAGE SIZE [KB] | READ IOPS | WRITE IOPS | READ TRANSFER RATE [MB/s] | WRITE TRANSFER RATE [MB/s] |
|---|---|---|---|---|---|---|---|
| 2020/11/21 00:00:00 | 11111111-2222-3333-4444-555555555555 | | | | | | |
| | 22222222-3333-4444-5555-666666666666 | | | | | | |
| | 33333333-4444-5555-6666-777777777777 | | | | | | |
| | 44444444-5555-6666-7777-888888888888 | | | | | | |
| | 55555555-6666-7777-8888-999999999999 | | | | | | |
| | 66666666-7777-8888-9999-aaaaaaaaaaaa | | | | | | |
| | 77777777-8888-9999-aaaa-bbbbbbbbbbbb | | | | | | |
| | 88888888-9999-aaaa-bbbb-cccccccccccc | | | | | | |
| 2020/11/21 00:01:00 | 11111111-2222-3333-4444-555555555555 | | | | | | |
| | 22222222-3333-4444-5555-666666666666 | | | | | | |
| | 33333333-4444-5555-6666-777777777777 | | | | | | |
| | 44444444-5555-6666-7777-888888888888 | | | | | | |
| | 55555555-6666-7777-8888-999999999999 | | | | | | |
| | 66666666-7777-8888-9999-aaaaaaaaaaaa | | | | | | |
| | 77777777-8888-9999-aaaa-bbbbbbbbbbbb | | | | | | |
| | 88888888-9999-aaaa-bbbb-cccccccccccc | | | | | | |

VOLUME PERFORMANCE TABLE

FIG. 11

| VOLUME ID | SOURCE NODE ID | DESTINATION NODE ID |
|---|---|---|
| 11111111-2222-3333-4444-555555555555 | aaaaaaaa-bbbb-cccc-dddd-eeeeeeeeeeee | dddddddd-eeee-ffff-0000-111111111111 |
| 22222222-3333-4444-5555-666666666666 | bbbbbbbb-cccc-dddd-eeee-ffffffffffff | cccccccc-dddd-eeee-ffff-000000000000 |
| 33333333-4444-5555-6666-777777777777 | cccccccc-dddd-eeee-ffff-000000000000 | bbbbbbbb-cccc-dddd-eeee-ffffffffffff |
| 44444444-5555-6666-7777-888888888888 | dddddddd-eeee-ffff-0000-111111111111 | aaaaaaaa-bbbb-cccc-dddd-eeeeeeeeeeee |

MOVE VOLUME TABLE

FIG. 12

| TIME STAMP | STORAGE NODE ID | PROCESSOR [%] | MEMORY [%] | DRIVE [%] | BACKEND [%] | FRONTEND [%] | INTERNODE [%] |
|---|---|---|---|---|---|---|---|
| 2020/11/21 00:00:00 | aaaaaaaa-bbbb-cccc-dddd-eeeeeeeeeeee | | | | | | |
| | bbbbbbbb-cccc-dddd-eeee-ffffffffffff | | | | | | |
| | cccccccc-dddd-eeee-ffff-000000000000 | | | | | | |
| | dddddddd-eeee-ffff-0000-111111111111 | | | | | | |
| 2020/11/21 00:01:00 | aaaaaaaa-bbbb-cccc-dddd-eeeeeeeeeeee | | | | | | |
| | bbbbbbbb-cccc-dddd-eeee-ffffffffffff | | | | | | |
| | cccccccc-dddd-eeee-ffff-000000000000 | | | | | | |
| | dddddddd-eeee-ffff-0000-111111111111 | | | | | | |

RESOURCE UTILIZATION TABLE

FIG. 13

| TIME STAMP | VOLUME ID | RANDOM RATIO [%] | AVERAGE SIZE [KB] | READ IOPS | WRITE IOPS | READ TRANSFER RATE [MB/s] | WRITE TRANSFER RATE [MB/s] | LATENCY [US] |
|---|---|---|---|---|---|---|---|---|
| 2020/11/21 00:00:00 | 11111111-2222-3333-4444-555555555555 | | | | | | | |
| | 22222222-3333-4444-5555-666666666666 | | | | | | | |
| | 33333333-4444-5555-6666-777777777777 | | | | | | | |
| | 44444444-5555-6666-7777-888888888888 | | | | | | | |
| | 55555555-6666-7777-8888-999999999999 | | | | | | | |
| | 66666666-7777-8888-9999-aaaaaaaaaaaa | | | | | | | |
| | 77777777-8888-9999-aaaa-bbbbbbbbbbbb | | | | | | | |
| | 88888888-9999-aaaa-bbbb-cccccccccccc | | | | | | | |
| 2020/11/21 00:01:00 | 11111111-2222-3333-4444-555555555555 | | | | | | | |
| | 22222222-3333-4444-5555-666666666666 | | | | | | | |
| | 33333333-4444-5555-6666-777777777777 | | | | | | | |
| | 44444444-5555-6666-7777-888888888888 | | | | | | | |
| | 55555555-6666-7777-8888-999999999999 | | | | | | | |
| | 66666666-7777-8888-9999-aaaaaaaaaaaa | | | | | | | |
| | 77777777-8888-9999-aaaa-bbbbbbbbbbbb | | | | | | | |
| | 88888888-9999-aaaa-bbbb-cccccccccccc | | | | | | | |

PREDICTED PERFORMANCE TABLE

| RESOURCE UTILIZATION | LATENCY |
|---|---|
| $X < a$ | $L_a$ |
| $a < X \leq b$ | $L_b$ |
| $b < X$ | $L_c$ |
| | |

LATENCY ON RESOURCE UTILIZATION TABLE

FIG. 15

| VOLUME ID | MIGRATION START TIME |
|---|---|
| 22222222-3333-4444-5555-666666666666 | 2020/11/22 01:23:00 |
| 33333333-4444-5555-6666-777777777777 | 2020/11/22 02:34:00 |
| 44444444-5555-6666-7777-888888888888 | 2020/11/22 03:45:00 |

MIGRATION SCHEDULE TABLE

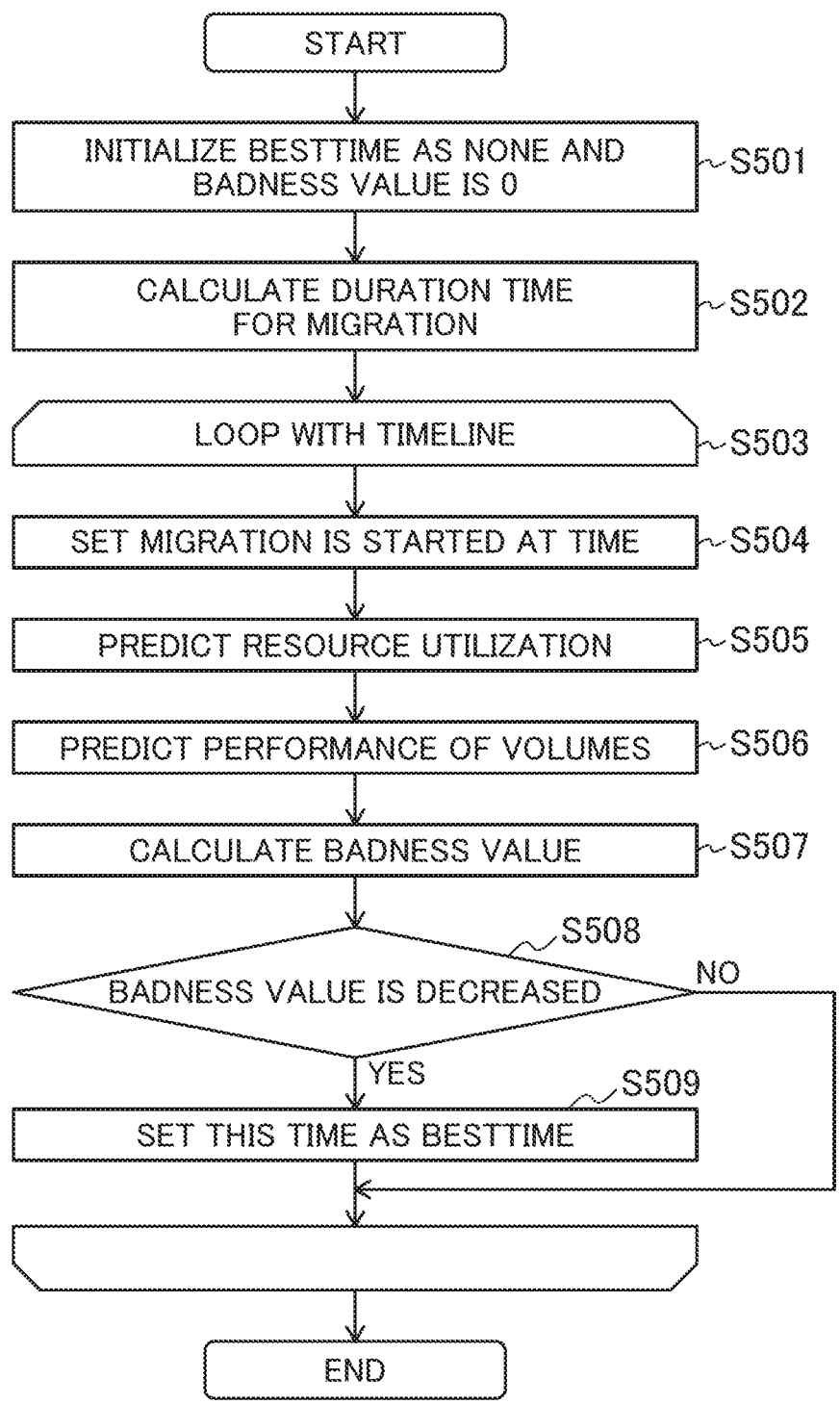

DISTRIBUTED STORAGE SYSTEM AND DATA MIGRATION METHOD

BACKGROUND

The present invention relates to a distributed storage system and a data migration method and is preferably applied to the distributed storage system and the data migration method which are configured to migrate data between/among nodes in order to smooth a load.

Nowadays, in a company or an organization that the number of users is large and a volume of data to be handled is large, there is a tendency that the company or the organization builds by itself a private cloud and provides an infrastructure, a platform and so forth for each department in the organization as a service for cost saving in place of use of a public cloud that a cloud service agent provides. In addition, the number of cases where a storage which is called a distributed storage or an SDS (Software Defined Storage) and which implements a storage function in the form of software on a low-cost general server is used in place of an existing dedicated storage device for reduction of TCO (Total Cost of Ownership) of the storage which builds the private cloud is increased. Since in the private cloud, various applications operate and there exists an SLA (Service Level Agreement) of a latency which is made different per data, an automation technology which is used for improving a utilization ratio of a resource by reducing a running cost is attracting attention.

Incidentally, in an environment that the number of storage-use computers is large and various workloads are present in a mixed state just like the private cloud, it is necessary to meet requirements of each data by automatically migrating the data (a volume), without manually deciding a data migration destination by a manager.

Here, for example, in U.S. Pat. No. 8,935,500, an art which relates to a storage DRS (Distributed Resource Scheduler) is disclosed. According to U.S. Pat. No. 8,935,500, in the storage DRS, data is replaced to respective storage-use computers so s to smooth the load between/among the nodes on the basis of statistical information. More specifically, the storage DRS detects an abnormality of a latest latency, selects appropriate data from a node from which the abnormality of the latency is detected, migrates the selected data to another node and thereby recovers the abnormality of the latency.

In addition, in Japanese Unexamined Patent Application Publication No. 2014-178975, a computer device which aims to improve a reduction in access performance which would occur due to application of a load and so forth to a virtual storage is disclosed. In the computer device which is disclosed in Japanese Unexamined Patent Application Publication No. 2014-178975, increase and decrease of a memory capacity of a cache memory are controlled in accordance with a use frequency of the cache memory.

Patent Literature 1: U.S. Pat. No. 8,935,500
Patent Literature 2: Japanese Unexamined Patent Application Publication No. 2014-178975

SUMMARY

However, in the existing art which is disclosed in U.S. Pat. No. 8,935,500, a workload of data to be migrated and the latency after data migration are not taken into consideration and it is impossible to accurately predict a degree that the latency on a migration destination node is increased. Therefore, such a problem occurs that it is impossible to select optimum data to be migrated and an optimum migration destination node and, on the contrary, the abnormality of the latency occurs due to a load applied at the time of data migration in some cases. In addition, although in the existing art which is disclosed in Japanese Unexamined Patent Application Publication No. 2014-178975, it is attempted to improve a bottleneck by focusing the use frequency of the cache memory when the load on the application is increased, it is impossible to appropriately decide a component which would become the bottleneck simply by focusing on the use frequency of the cache memory and it is difficult to migrate target data accurately.

The present invention has been made in view of the above-mentioned points at issue and aims to provide the distributed storage system and the data migration method which are configured to decide a highly accurate data migration pattern on the basis of usages of a plurality of kinds of resources and by taking an influence of execution of data migration on the respective resources into consideration.

In order to solve the above-mentioned problems, according to one embodiment of the present invention, there is provided a distributed storage system which includes a plurality of nodes which are connected with one another over a network, have processors and memories individually and thereby provide a volume into/from which a host system inputs/outputs data and a storage medium which stores the data which is input into/output from the volume and in which the processor of any one of the nodes acquires a per-period usage of each of a plurality of kinds of resources per data, estimates the per-period usage of each resource on a migration destination node when the data is migrated to the migration destination node by using the acquired per-data resource usage and calculates an estimate of the latency from the estimated usage of each resource, and decides a migration pattern of the data on the basis of the estimate of the latency.

In order to solve the above-mentioned problems, according to another embodiment of the present invention, there is also provided the data migration method in a distributed storage system which includes a plurality of nodes which are connected with one another over a network, have processors and memories individually and thereby provide the volume into/from which a host system inputs/outputs data and a storage medium which stores the data which is input into/output from the volume, including the steps of acquiring a per-period usage of each of a plurality of kinds of resources per data by the processor of any one of the nodes, estimating the per-period usage of each resource on the migration destination node when the data is migrated to the migration destination node by using the acquired per-data resource usage and calculating an estimate of the latency from the estimated usage of each resource by the processor of any one of the nodes, and deciding the migration pattern of the data on the basis of the estimate of the latency by the processor of any one of the nodes.

According to the present invention, it becomes possible to decide the highly accurate data migration pattern on the basis of the usages of the plurality of kinds of resources and by taking the influence of execution of the data migration on each resource into consideration.

BRIEF DESCRIPTION OF THE DRAWINGS

FIG. 6 is a diagram illustrating one configuration example of a system configuration table.

FIG. 7 is a diagram illustrating one configuration example of a node configuration table.

FIG. 8 is a diagram illustrating one configuration example of a volume placement table.

FIG. 10 is a diagram illustrating one configuration example of a volume performance table.

FIG. 11 is a diagram illustrating one configuration example of a move volume (volume migration) table.

FIG. 12 is a diagram illustrating one configuration example of a resource utilization (rate) table.

FIG. 13 is a diagram illustrating one configuration example of a predicted performance table.

FIG. 15 is a diagram illustrating one configuration example of a migration schedule table.

FIG. 22 is a flowchart illustrating one processing procedure example of migration scheduling processing.

DETAILED DESCRIPTION

Figure 1:
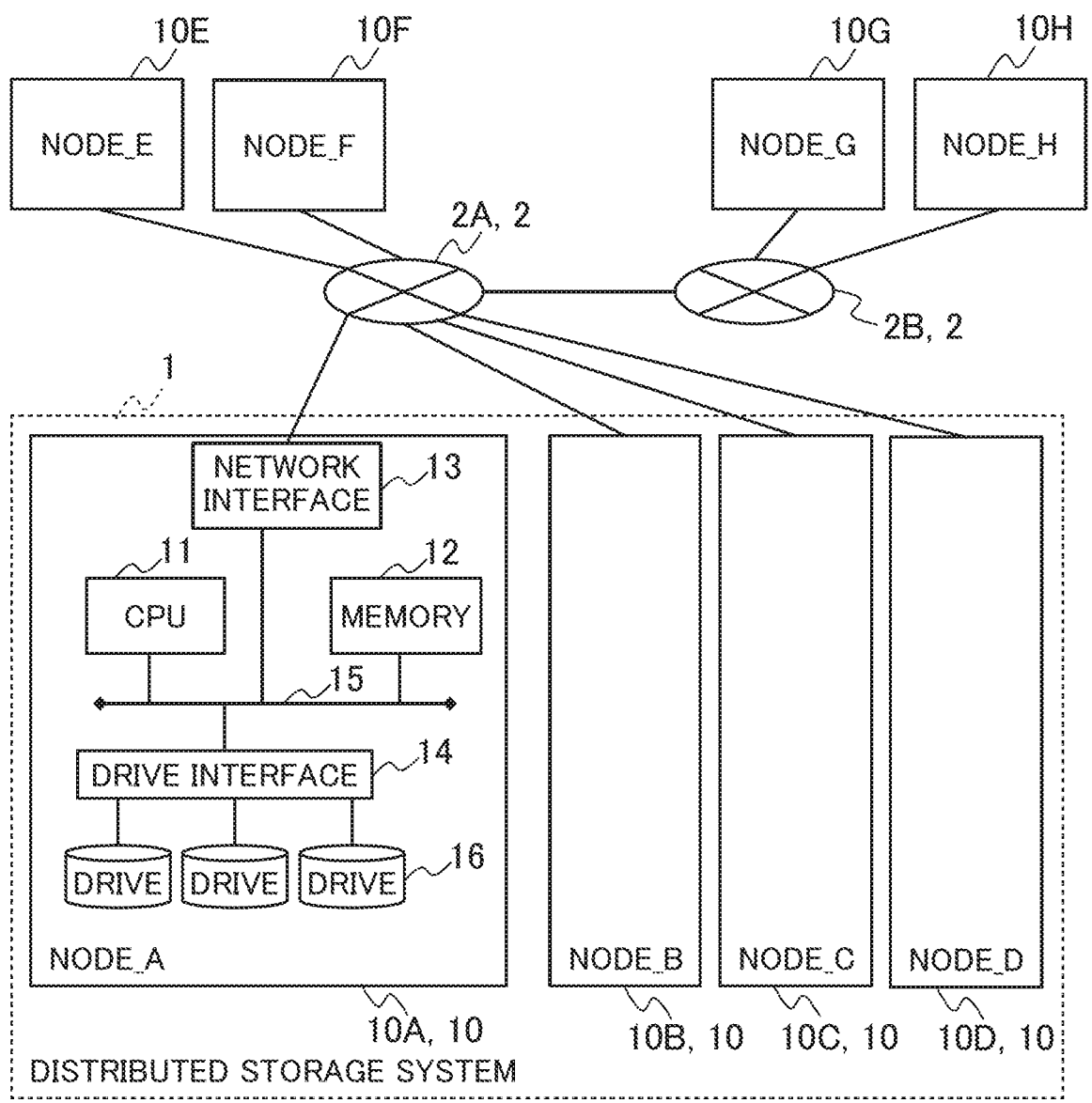
FIG. 1 is a block diagram illustrating one configuration example of a distributed storage system according to one embodiment of the present invention.

In the following, one embodiment of the present invention will be described with reference to the drawings. Incidentally, the embodiment which will be described in the following does not limit the invention defined in patent claims and all the combinations of characteristics which are described in the embodiment are not necessarily essential for solutions in the present invention. In the following description, although there are cases where various kinds of information are described by using expressions such as "table", "list", "cue" and so forth, the various kinds of information may be expressed in the form of data structures other than the above. There are cases where "XX table", "XX list" and so forth are called "XX information" in order to indicate that the various kinds of information do not depend on the data structures. Although expressions such as "identification information", "identifier", "name", "ID", "number" and so forth are used when describing contents of each piece of information, mutual replacement of these expressions is possible.

In the present embodiment, a distributed storage system will be disclosed. Thus, first, the basic description of the distributed storage system will be made.

The distributed storage system is configured by mutually connecting a plurality of storage-use computers each including a storage device, the processor and so forth over the network. Each of the computers is also called the node in the network. Each computer which configures the distributed storage system is also called a storage node in particular and each computer which configures a compute cluster is also called a compute node.

An OS (Operating System) which is adapted to manage and control each storage node is installed on each storage node which configures the distributed storage system and the distributed storage system is configured by operating storage software which has a function of a storage system on the OS. It is possible to configure the distributed storage system also by operating the storage software in the form of a container on the OS. The container is a mechanism of packaging one or more piece (s) of software and one or more piece (s) of configuration information. In addition, it is also possible to configure the distributed storage system by installing a hypervisor on the storage node and operating the OS and the software as VMs (Virtual Machines).

In addition, the present invention is also applicable to a case where a system which is called an HCI (Hyper-Converged Infrastructure). The HCI is a system which makes it possible to execute a plurality of pieces of processing by one node by operating an application, middleware, management software and the container other than the storage software on the OS or the hypervisor which is installed on each node.

The distributed storage system provides the host with a storage pool that capacities of storage devices on a plurality of storage nodes are virtualized and a logical volume (also simply called a volume). In a case where the host issues an IO command to any one of the storage nodes, the distributed storage system provides the host with access to data by transferring the IO command to the storage node which holds data that the IO command designates. Owing to this characteristic, it becomes possible for the distributed storage system to move (migrate) the data (the volume) between/ among the respective storage nodes without stopping issuance of the IO command from the host.

It becomes possible for the manager of the distributed storage system to execute processing such as preparation, deletion, movement (migration) and so forth of the volume by issuing a management command to the distributed storage system over the network. In addition, it becomes possible for the distributed storage system to notify the manager and a management tool of a state of the distributed storage system such as a drive use situation, the processor use situation and so forth of the distributed storage system by providing the manager and the management tool with information that the distributed storage system transmits over the network.

A distributed storage system 1 according to one embodiment of the present invention will be described in detail.

FIG. 1 is a block diagram illustrating one configuration example of the distributed storage system 1 according to the present embodiment. As illustrated in FIG. 1, the distributed storage system 1 is configured by mutually connecting a plurality of nodes 10A to 10D (generally called a node 10)

which are storage nodes over a network 2A. Although there is no particular limitation on a hardware configuration of each storage node, each storage node has a CPU (Central Processing Unit) 11, a memory 12, a network interface 13, a drive interface 14, an internal network 15, a drive 16 and so forth, for example, just like the node 10A which is illustrated in FIG. 1. The node 10A is connected to the network 2A via the network interface 13 and communities with other storage nodes (the nodes 10B to 10D).

In FIG. 1, also nodes 10E and 10F are connected to the network 2A and nodes 10G and 10H are connected to a network 2B which is connected to the network 2A. Although, here, the nodes 10A to 10D in a local site are illustrated in FIG. 1 as nodes which configure the distributed storage system 1, the node 10 which configures the distributed storage system 1 is not limited to the node in the local site in the present embodiment and may also include the node (for example, nodes 10E to 10H) in a remote site. In a case of configuring the distributed storage system 1 in this way, it becomes possible to handle the nodes in the local site and the nodes in the remote site as one cluster.

Incidentally, there is no limitation on the physical distance between the network 2A and the network 2B. Accordingly, in a case where the networks 2A and 2B are configured at places which are sufficiently separated from each other physically and the nodes 10G and 10H are included in the node 10 which configures the distributed storage system 1, it becomes possible to store data in the physically separated nodes 10G and 10H as disaster countermeasure.

In addition, although in the example illustrated in FIG. 1, all the nodes 10A to 10C which configure the distributed storage system 1 are configured by the storage nodes, the nodes which configure the distributed storage system 1 are not limited to the storage nodes in the present embodiment and the distributed storage system 1 may have a configuration that nodes which function as compute nodes are partially included.

Figure 2:
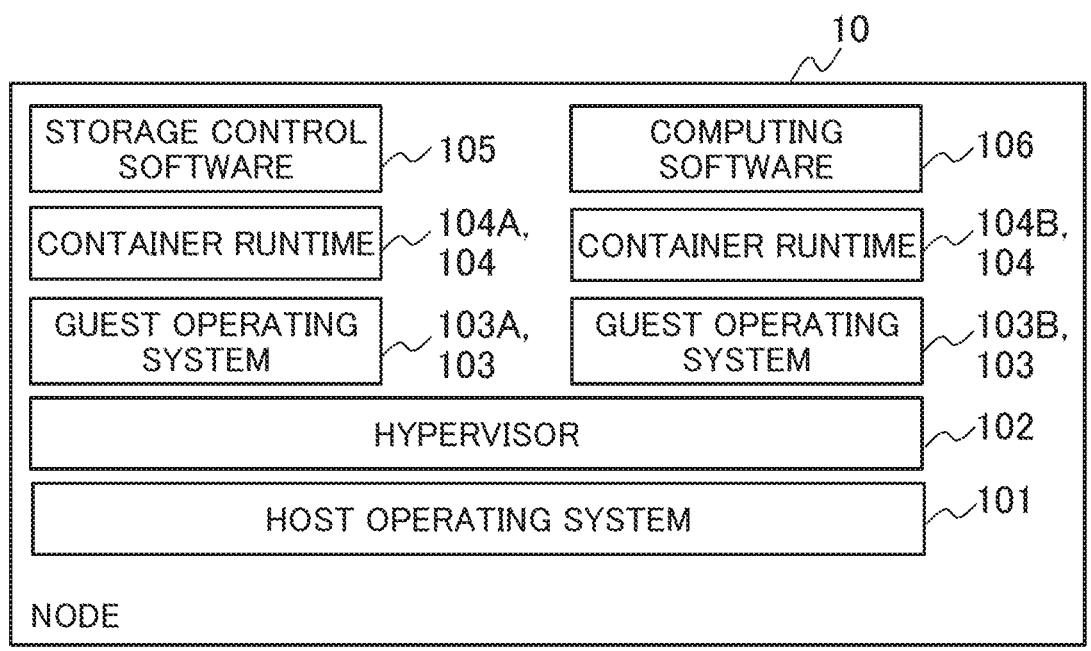
FIG. 2 is a block diagram illustrating one configuration example of a software-stack of a node.

FIG. 2 is a block diagram illustrating one configuration example of a software-stack of the node. It may be thought that the configuration of the software-stack which is illustrated in FIG. 2 commonly applies to the nodes 10A to 10D which configure the distributed storage system 1 and further commonly applies to the other nodes 10E to 10H.

As illustrated in FIG. 2, a host OS (Operating System) 101 which is adapted to control hardware operates in the node 10 and a hypervisor 102 which is adapted to operate one or more guest OS(s) 103 (103A and 103B individually) as virtual machines (VMs) operates on the host OS 101.

Then, a container runtime 104 (104A and 104B individually) which is adapted to operate one or more container (s) operates on each guest OS 103 and storage software 105 and computing software 106 operate on the container runtime 104.

Incidentally, in the software-stack, in a case where the hypervisor 102 includes a function for controlling the hardware, it is possible to eliminate the host OS 101. In addition, in a case where it is not necessary to operate each piece of software on the VM, it is possible to eliminate the hypervisor 102 and the guest OS 103 and, in this case, it is possible to operate the container runtime 104 on the host OS 101. In addition, in a case where the storage software 105 and the computing software 106 do not operate as the containers, it is possible to eliminate the container runtime 104 and, in this case, it is possible to operate the storage software 105 and the computing software 106 directly on the guest OS 103 or the host OS 101.

Figure 3:
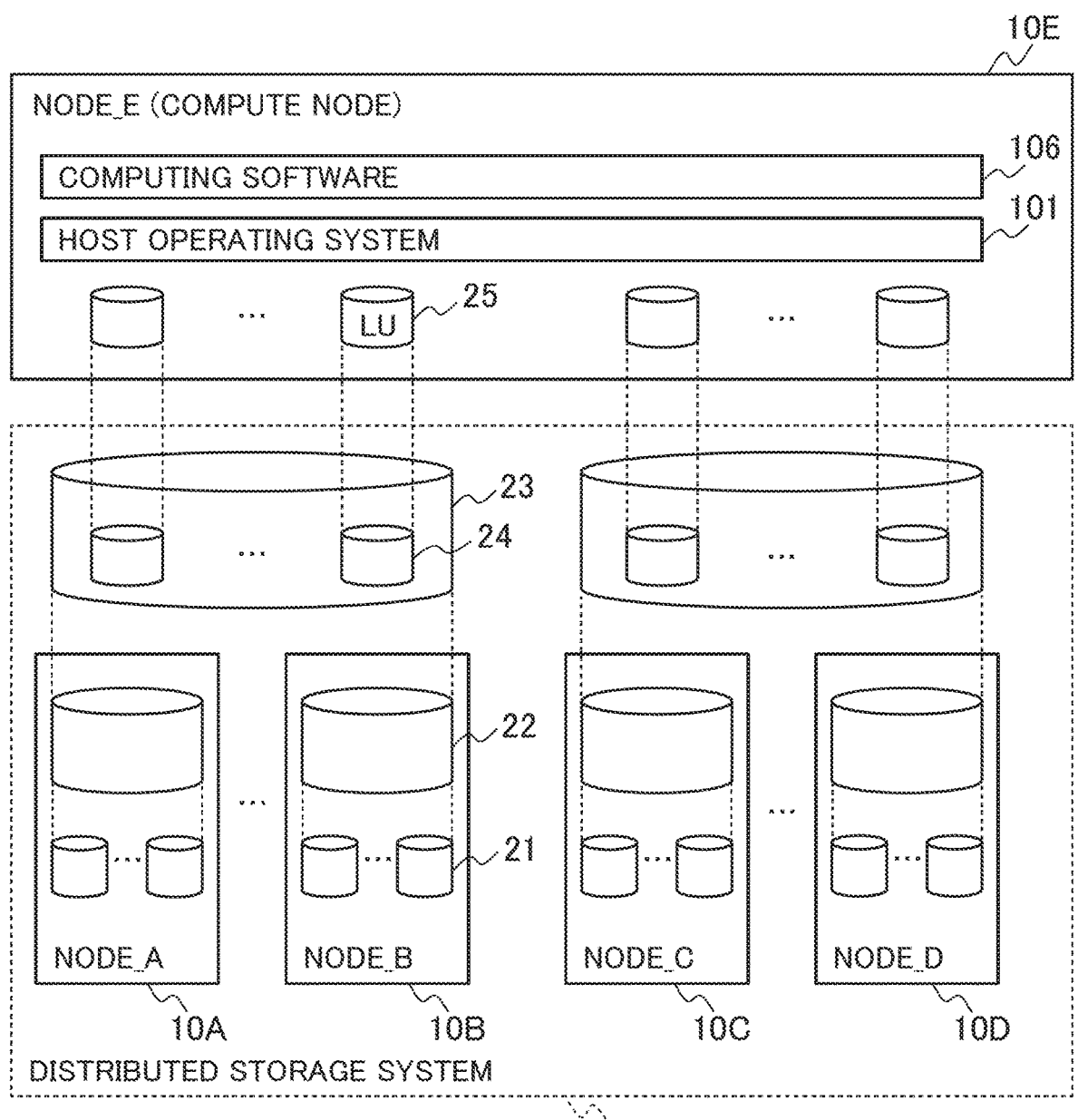
FIG. 3 is a diagram illustrating one example of a relation among a physical drive, a drive pool, a logical pool, a logical volume and a logical unit in the distributed storage system.

FIG. 3 is a diagram illustrating one example of a relation among a physical drive, a drive pool, a logical pool, a logical volume and a logical unit in the distributed storage system 1.

In FIG. 3, the nodes 10A to 10D are the storage nodes which configure the distributed storage system 1 and the node 10E is the compute node. In the distributed storage system 1, one or more physical drive(s) 21 is/are installed on each of the nodes 10A to 10C. Then, the storage software recognizes a capacity of each of the nodes 10A to 10D with the total of capacities of the respective physical drives 21 being defined as a drive pool 22.

In addition, the distributed storage system 1 defines a logical pool 23 as a unit on the basis of which the capacity is logically managed. The logical pool 23 and one or more drive pool(s) 22 are set in correspondence with each other and thereby the data which is stored in the logical pool 23 is stored into any one of the physical drives which are included in the drive pool 22 which is set in correspondence with the logical pool 23. In this case, it is also possible to define the size of the logical pool 23 to a size which is larger than the total size of the drive pools 22 by using a so-called Thin Provisioning technology.

Further, it is possible for the distributed storage system 1 to define one or more logical volume (s) (volume (s)) 24 in the logical pool 23 and it is possible to exhibit the volume 24 to the node 10E which is the compute node as a logical unit (LU) 25.

In the configuration in FIG. 3, in a case where the computing software 106 of the compute node (the node 10E) executes data writing to the LU 25 which is mounted by the host OS 101, the data writing is processed as data writing to the volume 24 on the distributed storage system 1. In a case where a logical address which is used to execute the data writing is new in the space when using the Thin Provisioning technology, this new logical address is set in correspondence with a physical address of any one of the physical drives 21 in any one of the drive pools 22 which are set in correspondence with one logical pool 23.

As described above, in the distributed storage system 1, a free space of the physical drive is not reduced simply by defining the volume 24 and a free capacity of the node 10 is reduced when a write IO command to the new logical address is generated. On the other hand, in a case where the Thin Provisioning technology is not used, when the volume 24 is defined, physical addresses of all the logical drives 21 are allocated to the volume 24 and the free capacity of the node 10 is reduced. In either case, in a case where the volume 24 is deleted, the total free capacity of the node 10 is increased by the amount corresponding to a physical capacity which is allocated to the volume 24 concerned.

Figure 4:
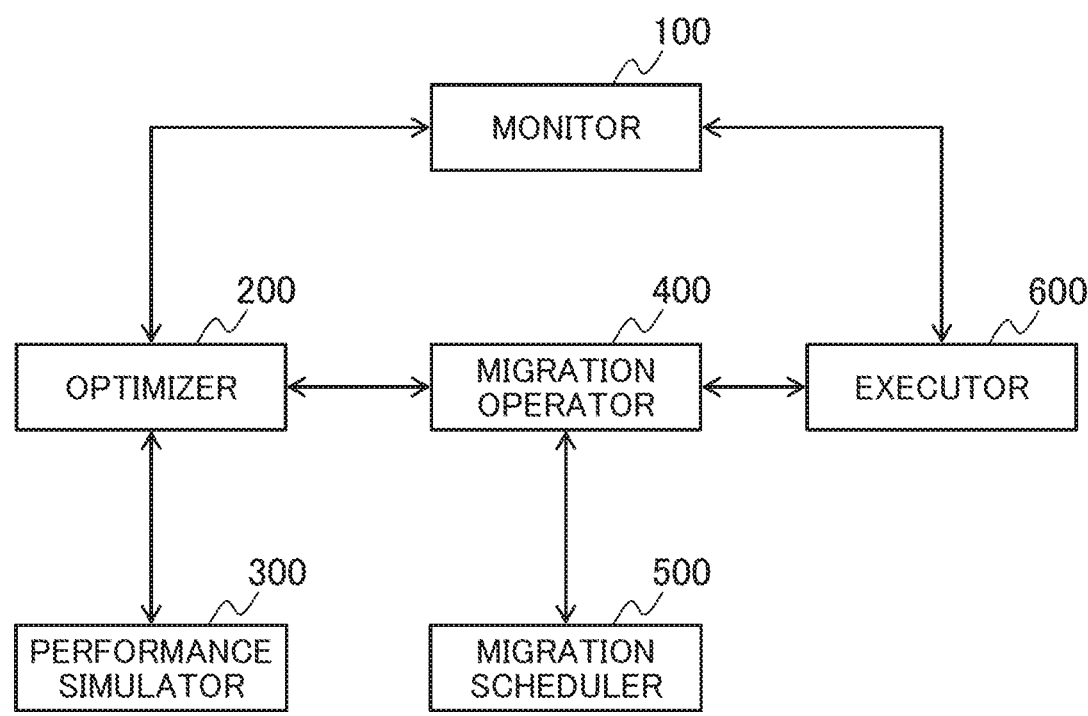
FIG. 4 is a schematic diagram illustrating one example of a relation among software modules in the distributed storage system.

FIG. 4 is a schematic diagram illustrating one example of a relation among software modules in the distributed storage system 1. As illustrated in FIG. 4, the distributed storage system 1 has a monitor 100, an optimizer 200, a performance simulator 300, a migration operator 400, a migration scheduler 500 and an executer 600 as the software modules.

The respective software modules which are illustrated in FIG. 4 are capable of communicating with one another and capable of performing information transmission and reception. A place where each software module is executed may be on the node which is the same as the storage node and may be on another node as long as the place is a place where access to the distributed storage system 1 is possible over the network 2. In addition, it is not necessary for all the software modules to be mounted on the same node. Each software module may be executed in an optional form such as a process, a container and so forth.

In the present embodiment, the monitor 100 monitors (monitoring processing) loads on hardware such as the CPU 11, the drive 16 and so forth which are included in each node 10 of the distributed storage system 1. Details of the monitoring processing will be described later with reference to FIG. 16.

Then, the optimizer 200 evaluates the load on the distributed storage system 1 with reference to monitoring information which is provided by the monitor 100 and performs optimization calculations for calculating an appropriate placement for smoothing the load. In the optimization calculations, a future performance of a volume replacement plan that the optimizer 200 proposes is predicted by the performance simulator 300 and the optimizer 200 evaluates a result of prediction. It becomes possible for the optimizer 200 to search out an optimum volume placement by repetitively executing this processing. When the optimum volume placement is decided, the optimizer 200 calls the migration operator 400. The above-mentioned processing which is executed by the optimizer 22 is called optimum placement decision processing and details thereof will be described later with reference to FIG. 17 and FIG. 18. In addition, the above-mentioned processing which is executed by the performance simulator 300 is called performance simulation processing and details thereof will be described later with reference to FIG. 20.

The migration operator 400 observes a per-volume time-series load and decides a time at which migration of each volume is started in cooperation with the migration scheduler 500. Thereby, it becomes possible to execute migration of each volume in a time zone which is low in IO load and therefore it becomes possible to reduce risk that the distributed storage system 1 is overloaded by migration. The above-mentioned processing which is executed by the migration operator 400 is called migration decision processing and details thereof will be described later with reference to FIG. 21. In addition, the above-mentioned processing which is executed by the migration scheduler 500 is called migration scheduling processing and details thereof will be described later with reference to FIG. 22.

Then, the executer 600 executes the migration in accordance with a migration start time that the migration operator 400 decides. Incidentally, while the migration is being executed, the monitor 100 monitors (executes monitoring of) the load on the hardware of the distributed storage system 1. Then, in a case where the load on the hardware of the distributed storage system. 1 exceeds a predetermined threshold value while the migration is being executed, the monitor 100 issues an alert to the executer 600. In this case, the executer suppresses overload on the distributed storage system 1, for example, by controlling so as to reduce a rate at which data is transferred in association with the migration and so forth.

Figure 5:
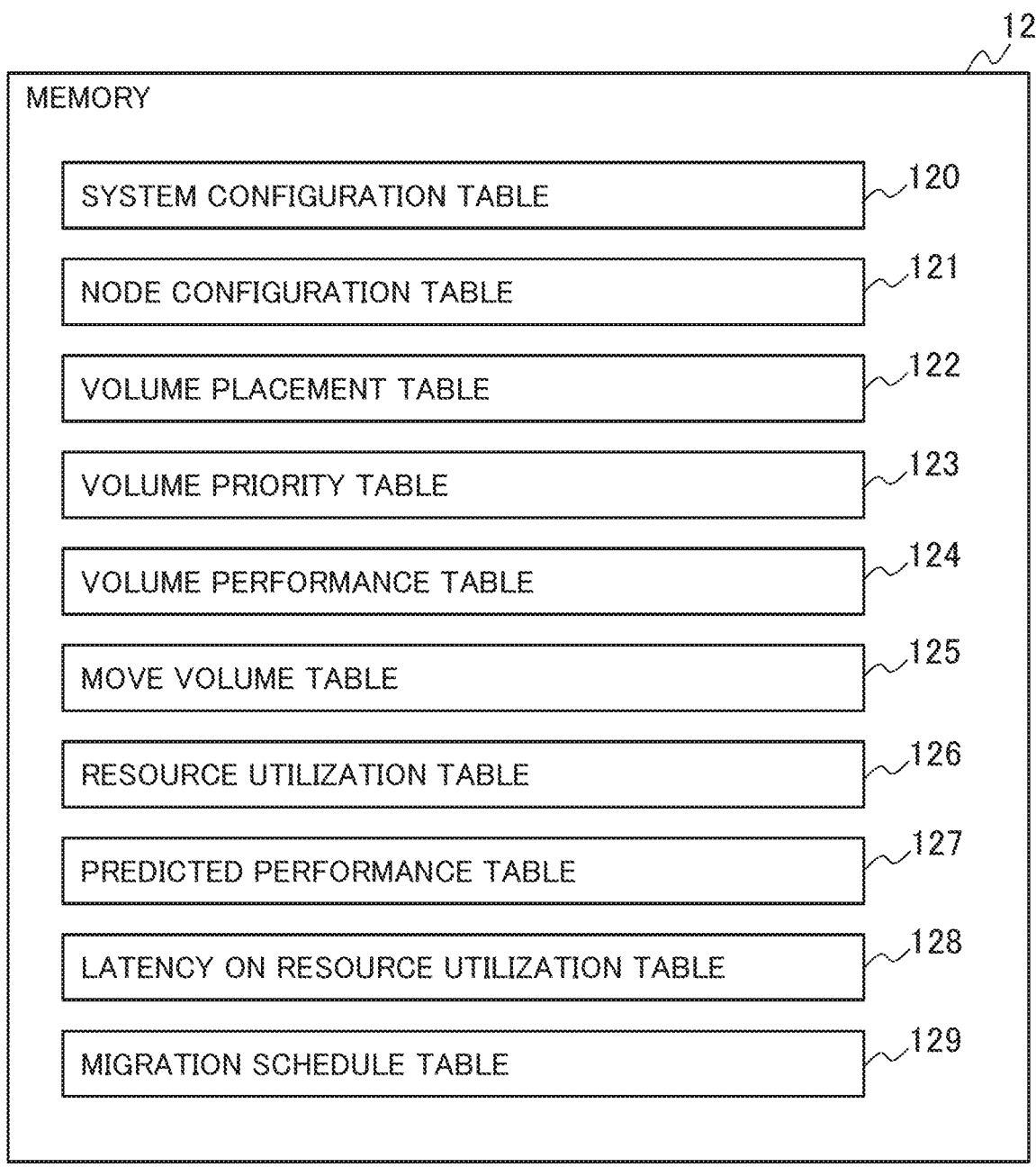
FIG. 5 is a block diagram illustrating one configuration example of a memory map.

FIG. 5 is a block diagram illustrating one configuration example of a memory map. As illustrated in FIG. 5, various kinds of data tables to be used for executing optimization processing for the data migration in the distributed storage system 1 according to the present embodiment is stored in the memory 12 of the node 10.

Specifically, a system configuration table 120, a node configuration table 121, a volume placement table 122, a volume priority table 123, a volume performance table 124, a move volume (volume migration) table 125, a resource utilization table 126, a predicted performance table 127, the latency on resource utilization table 128 and a migration schedule table 129 are stored in the memory 12. These data tables are appropriately accessed when executing the processing by each software module which is illustrated in FIG. 4 and data reference, data reading, data generation, data writing, data-updating or the like is executed.

In the following, the respective data tables which are illustrated in FIG. 5 will be described in detail with reference to FIG. 6 to FIG. 15. Incidentally, FIG. 6 to FIG. 15 mainly illustrate table configurations of the respective data tables and there are places where description of data values is omitted and are left blank.

FIG. 6 is a diagram illustrating one configuration example of the system configuration table 120. The system configuration table 120 is a data table which is used for management of the configuration of the distributed storage system 1. In the example in FIG. 6, the system configuration table 120 has fields (data items) of a server model 1201 and the number of servers 1202. A model name of the storage node which configures the distributed storage system 1 is described in the server model 1201 and the number of storage nodes which configure the distributed storage system 1 is described in the number of the servers 1202.

FIG. 7 is a diagram illustrating one configuration example of the node configuration table 121. The node configuration table 121 is a data table which indicates the configuration of each node 10 which configures the distributed storage system 1. In the example in FIG. 7, the node configuration table 121 has data items of the storage node ID 1211, a processor frequency 1212, the number of processors 1213, a memory 1214, a bandwidth of internode network 1215, a bandwidth of compute network 1216, the number of drives 1217, a total capacity 1218 and an used capacity 1219 and the specification of the hardware which is loaded on each node 10 is described in the table 121. In these items, a total value of the capacities of the drives which are loaded on the target node 10 is described in the total capacity 1218 and this capacity corresponds to the capacity of the drive pool 22. In addition, the total capacity which is allocated to each volume 24 from the physical drive 21 is described in the used capacity 1219.

FIG. 8 is a diagram illustrating one configuration example of the volume placement table. The volume placement table 122 is a data table which indicates such volume placement that each volume 24 is to be placed on which node 10. In the example in FIG. 8, the volume arrangement table 122 has data items of a volume ID 1221, the used capacity 1222 and the storage node ID 1223. The storage node ID 1223 in FIG. 8 corresponds to the storage node ID 1211 on the node configuration table 121 in FIG. 7.

Incidentally, in the present embodiment, it is possible to hold a plurality of the volume placement tables 122 which accord with applications in the same form. Specifically, volume placement which is obtained before optimization is recorded onto the first volume placement table 122. In addition, recommended volume placement that the optimizer 200 decides is recorded onto the second volume placement table 122 which is used for input into the migration operator 400.

Figure 9:
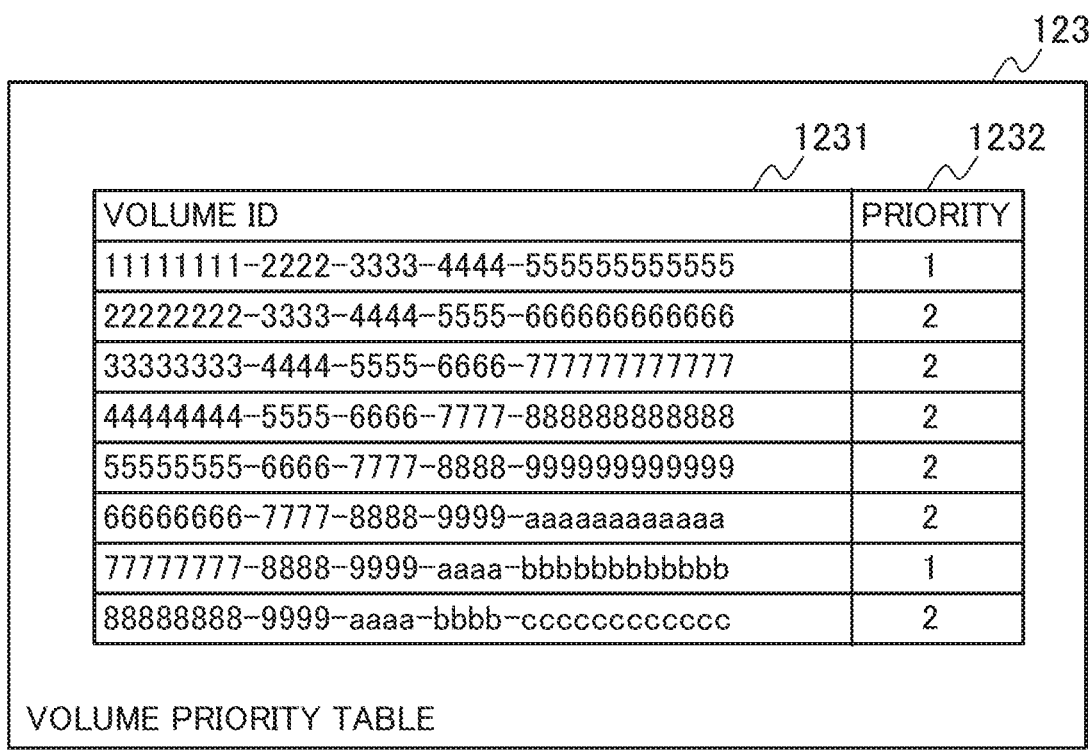
FIG. 9 is a diagram illustrating one configuration example of a volume priority table.

FIG. 9 is a diagram illustrating one configuration example of the volume priority table 123. The volume priority table 123 is a data table which indicates priority in migration of each volume 24. In the example in FIG. 9, the volume priority table 123 has data items of the volume ID 1231 and a priority 1232. The volume ID 1231 in FIG. 9 corresponds to the volume ID 1221 in FIG. 8. For example, a user is able to designate the priority 1232 in advance.

Although details will be described later, in the present embodiment, the migration operator 400 preferentially executes migration of a volume (a volume which is small in the value of the priority 1232) which is high in priority with reference to the volume priority table 123 not depending on the time-series load on the volume and thereby it becomes possible to improve a performance problem in a shorter time than the time taken for other volumes which are lower in priority.

FIG. 10 is a diagram illustrating one configuration example of the volume performance table 124. The volume performance table 124 is a data table which indicates performance information per volume 24 which is monitored by the monitor 100 in time series. In the example in FIG. 10, the volume performance table 124 has data items of a time stamp 1241, the volume ID 1242, a random ratio 1243, an average size 1244, a read IOPS (Input/Output operations Per Second) 1245, a write IOPS 1246, a read transfer rate 1247 and a write transfer rate 1248. the volume ID 1242 in FIG. 10 corresponds to the volume ID 1221 in FIG. 8 and the volume ID 1231 in FIG. 9.

FIG. 11 is a diagram illustrating one configuration example of the move volume (volume migration) table 125. The move volume table 125 is a data table which describes a migration source node and the migration destination node of each volume 24 and is delivered from the optimizer 200 as input into the performance simulator 300. In the example in FIG. 11, the move volume table 125 has data items of the volume ID 1251, a source node ID 1252 which indicates the node ID of the migration source node and a destination node ID 1253 which indicates the node ID of the migration destination node. the volume ID 1251 in FIG. 11 corresponds to the aforementioned other volume IDs (the volume ID 1221, the volume ID 1231 and the volume ID 1242).

FIG. 12 is a diagram illustrating one configuration example of the resource utilization table 126. The resource utilization table 126 is a data table which describes the time-series resource utilization rate per node 10 and is delivered from the performance simulator 300 as output to the optimizer 200. In the example in FIG. 12, the resource utilization table 126 has data items of the time stamp 1261 and the storage node ID 1262, and data items of resource utilization rate of each component in a storage controller which corresponds to the storage node ID 1262 (specifically, a processor 1263, a memory 1264, a drive 1265, a backend 1266, a frontend 1267 and an internode 1268). The time stamp 1261 in FIG. 12 corresponds to the time stamp 1241 in FIG. 10. In addition, the storage node ID 1262 in FIG. 12 corresponds to the storage node ID 1211 in FIG. 7 and the storage node ID 1223 in FIG. 8.

FIG. 13 is a diagram illustrating one configuration example of the predicted performance table 127. The predicted performance table 1227 is a data table which describes the time-series predicted performance per volume 24 as performance information which is calculated on trial by the performance simulator 300 and is delivered from the performance simulator 300 as output to the optimizer 200.

In the example IG. 13, the predicted performance table 127 has data items of the time stamp 1271, the volume ID 1272, the random ratio 1273, the average size 1274, the read IOPS 1275, the write IOPS 1276, the read transfer rate 1277, a write transfer rate 1278 and a latency 1279. In these data items, the data items other than the latency 1279 are the same as the data items of the volume performance table 124 in FIG. 10. The latency which is calculated on trial by the performance simulator 300 is described in the latency 1279 and the latency on resource utilization table 128 which will be described later (see FIG. 14) is used in the trial calculation.

Figures 14A, 14B:
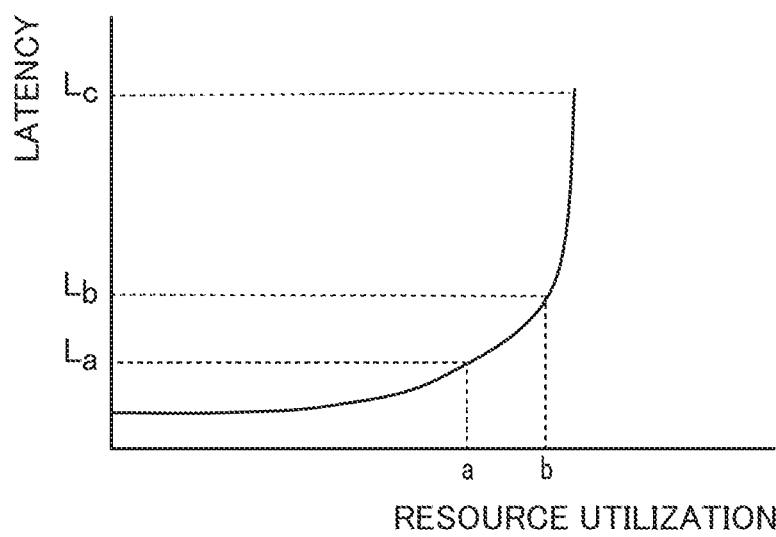
FIG. 14A is a diagram illustrating one configuration example of a latency on resource utilization table.
FIG. 14B is a diagram illustrating one example that a relation between the resource utilization and the latency is graphed.

FIG. 14 are diagrams describing one configuration of the latency on resource utilization table. FIG. 14A is a diagram illustrating one configuration example of the latency on resource utilization table 128 and FIG. 14B is a diagram illustrating one example that a relation between the resource utilization rate and the latency is graphed.

In general, the more the resource utilization rate is increased, the more a delay time (the latency) of processing is increased. Thus, in the example in FIG. 14A and FIG. 14B, as illustrated in the graph in FIG. 14B, a plurality of threshold values (a, b) are provided for the resource utilization rate, the resource utilization rate are divided into ranges on the basis of the threshold values and each maximum latency (La, Lb, Lc) in each range is decided in advance as the latency which corresponds to the resource utilization rate in the range concerned. It becomes possible to reduce a burden on processing by deciding in advance the latency which corresponds to the resource utilization rate by using an approximate value in this way. The latency on a resource utilization table 128 which has data items of a resource utilization 1281 and the latency 1282 is indicated in FIG. 14A on the basis of a way of thinking in FIG. 14B. Incidentally, it is possible to optionally set spacing (the threshold value) of the range and the number of the ranges. In addition, the latency on the resource utilization table 128 is held per resource.

FIG. 15 is a diagram illustrating one configuration example of the migration schedule table 129. The migration schedule table 129 is a data table which indicates a start time of migration per volume 24 which is decided by the migration schedular 500 and is delivered from the migration schedular 500 as output to the migration operator 400. In the example in FIG. 15, the migration schedule table 129 has data items of the volume ID 1291 and the migration start time 1292.

Next, the data migration processing that the distributed storage system 1 according to the present embodiment is able to execute will be described in detail by indicating processing executed by each software module which is illustrated in FIG. 4. Incidentally, in the following description relating to the data migration processing, the node 10 and the volume 24 which configure the distributed storage system 1 are simply called the "node" and the "volume" unless otherwise specified.

Figure 16:
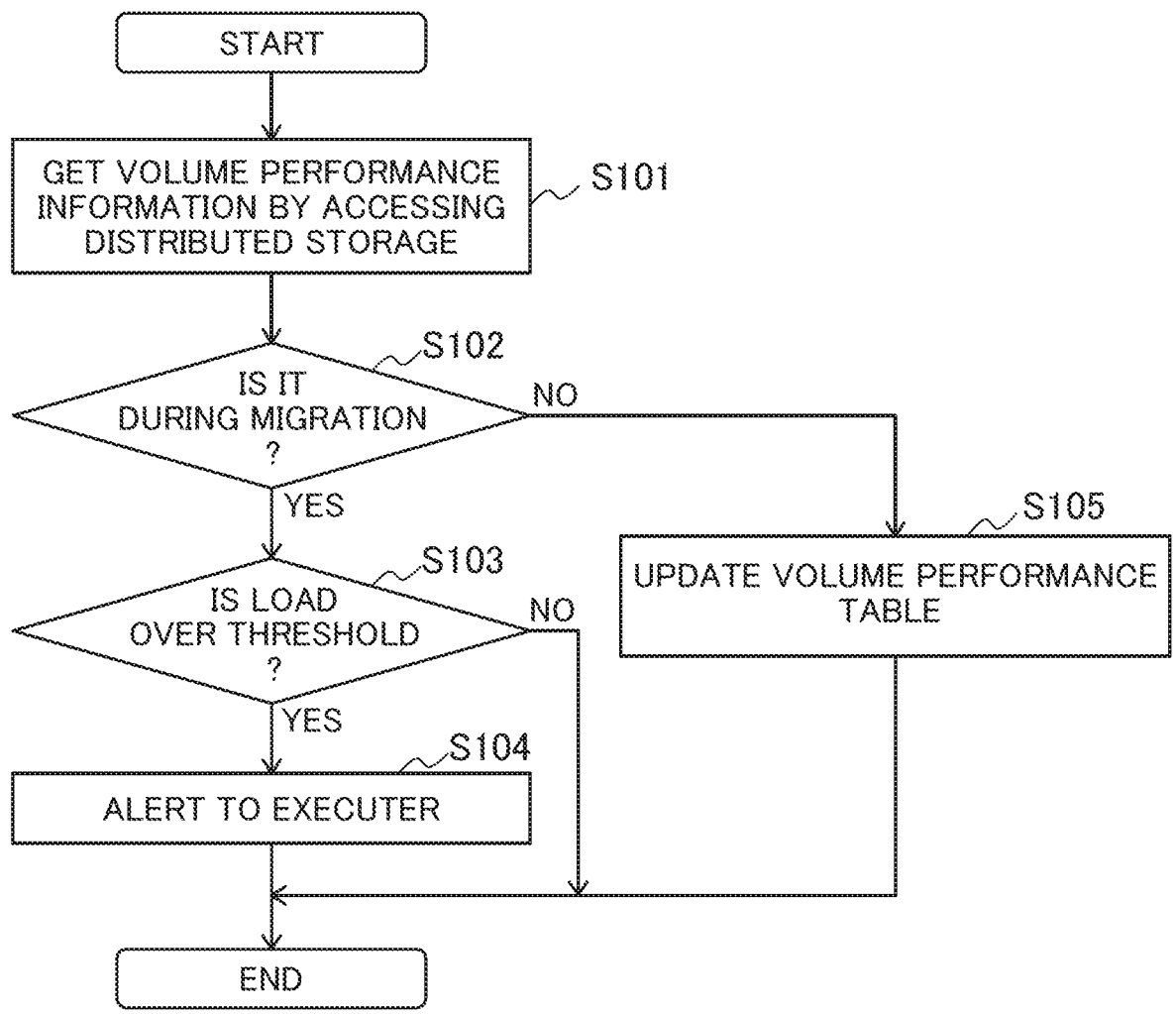
FIG. 16 is a flowchart illustrating one processing procedure example of monitoring processing.

FIG. 16 is a flowchart illustrating one processing procedure example of monitoring processing. The monitoring processing which is illustrated in FIG. 16 is started by a management tool and the storage software 105 in a time period and then the monitor 100 executes the monitoring processing.

Incidentally, in regard to an execution timing of the monitoring processing, it is possible to optionally set the time period and the time period may not be a constant period. For example, in a case where the migration is not executed, volume performance information may be monitored at intervals of one minute. On the other hand, while the migration is being executed, for example, the volume performance information may be acquired at short intervals such as at intervals of one second and so forth for the purpose of monitoring the load. In addition, for example, the interval at which the performance information is acquired may be varied depending on the load.

According to the flowchart in FIG. 16, first, the monitor 100 gains access to the distributed storage system 1 and acquires the volume performance information (step S101). In step S101, the monitor 100 acquires the loads on the hardware (specifically, for example, at least two or more pieces of hardware in the CPU, the memory, the drive, the network and so forth) as per-volume performance information and records a result of acquisition of the loads on the volume performance table 124.

Next, the monitor 100 decides whether the migration is being executed (step S102).

In a case where the migration is being executed in step S102 (YES in step S103), the monitor 100 confirms whether threshold abnormality that the load on the distributed storage system 1 exceeds a threshold value occurs (step S103). In a case where the load exceeds the threshold value (YES in step S103), the monitor 100 issues an alert to the executor 600 (step S104) and terminates execution of the processing. In addition, in a case where the load is less than the threshold value (NO in step S104), the monitor 100 terminates execution of the processing.

On the other hand, in a case where the migration is not being executed in step S102 (NO in step 102), the monitor 100 updates the volume performance table 124 by describing the performance information which is acquired in step S101 in the volume performance table 124 (step S105) and terminates execution of the processing.

Figure 17:
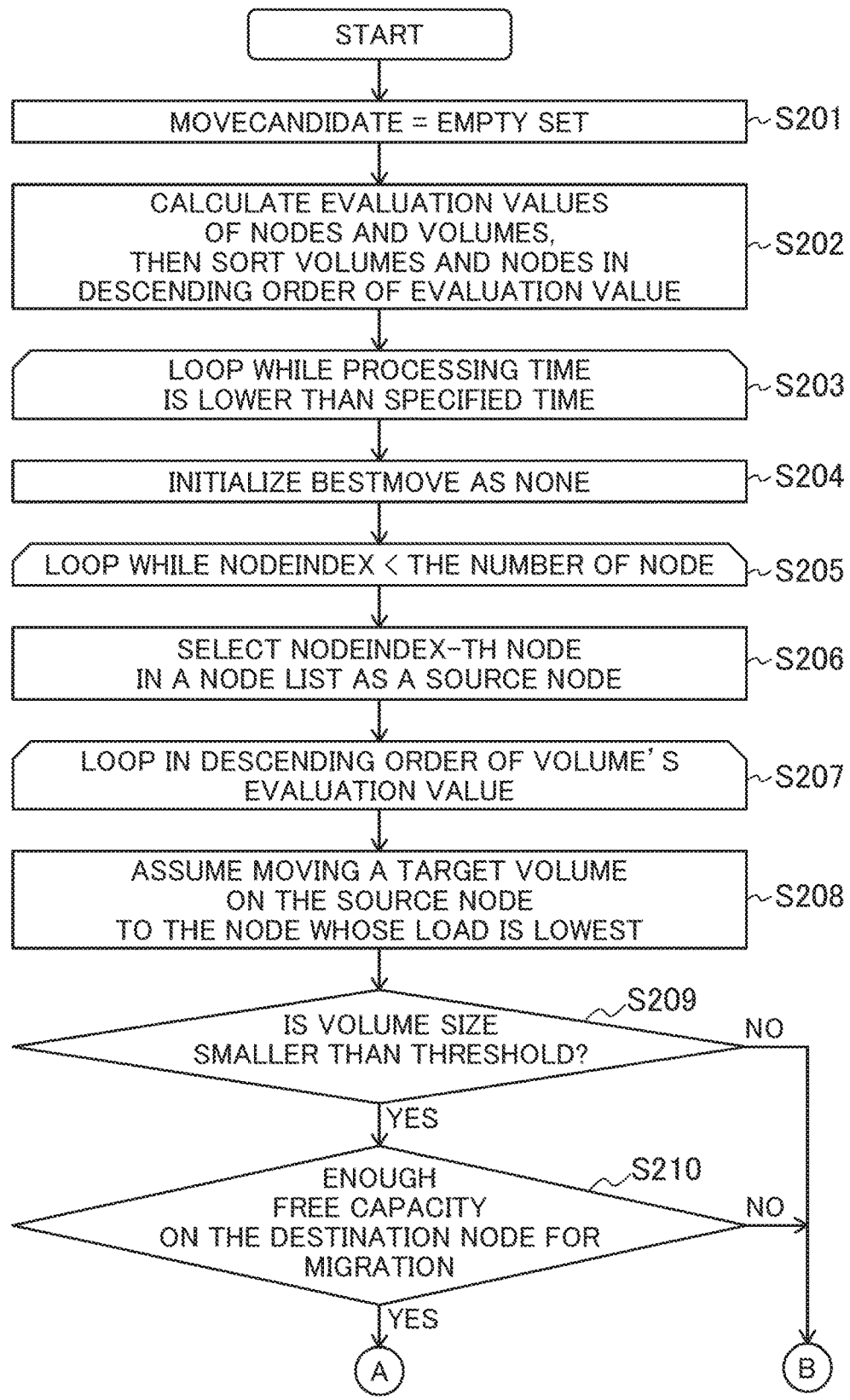
FIG. 17 is a flowchart (a part 1) illustrating one processing procedure example of optimum placement decision processing.
Figure 18:
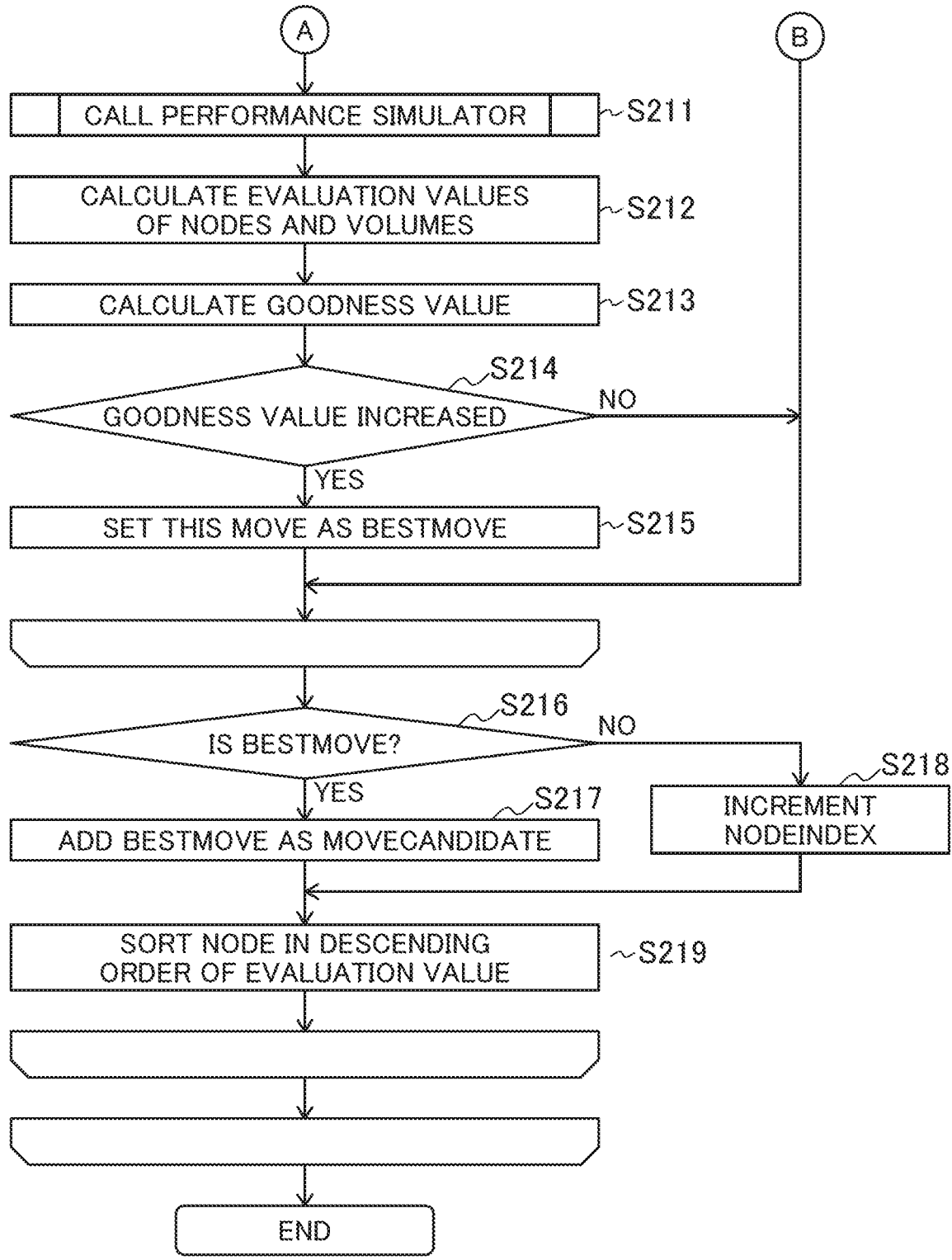
FIG. 18 is a flowchart (a part 2) illustrating one processing procedure example of the optimum placement decision processing.

FIG. 17 is a flowchart (a part 1) illustrating one processing procedure example of optimum placement decision processing and FIG. 18 is a flowchart (a part 2) illustrating one processing procedure example of the optimum placement decision processing. The optimum placement decision processing which is illustrated in FIG. 17 and FIG. 18 is started by the management tool and the storage software 105 in the time period and then the optimizer 200 executes the optimum placement decision processing. Specifically, for example, an operation method of executing the optimum placement decision processing one time at intervals of 24 hours so as to look again the placement of the volumes and so forth are conceived of.

According to the flowcharts in FIG. 17 and FIG. 18, the optimizer 200 sets "MoveCandidate" which is a variable which indicates a set of candidates for node migration empty (step S201). The set of candidates for node migration indicates a list of the migration source nodes and the migration destination nodes of each volume.

Next, the optimizer 200 executes an evaluation value calculation for calculating evaluation values of the node and the volume and rearranges the nodes and the volumes in descending order of evaluation values on the basis of a calculation result of the evaluation value calculation (step S202). Then, the optimizer 200 executes processes in step S203 and succeeding steps with arrangement of the nodes and the volumes which are rearranged in step S202 being set as a standard.

Figure 19:
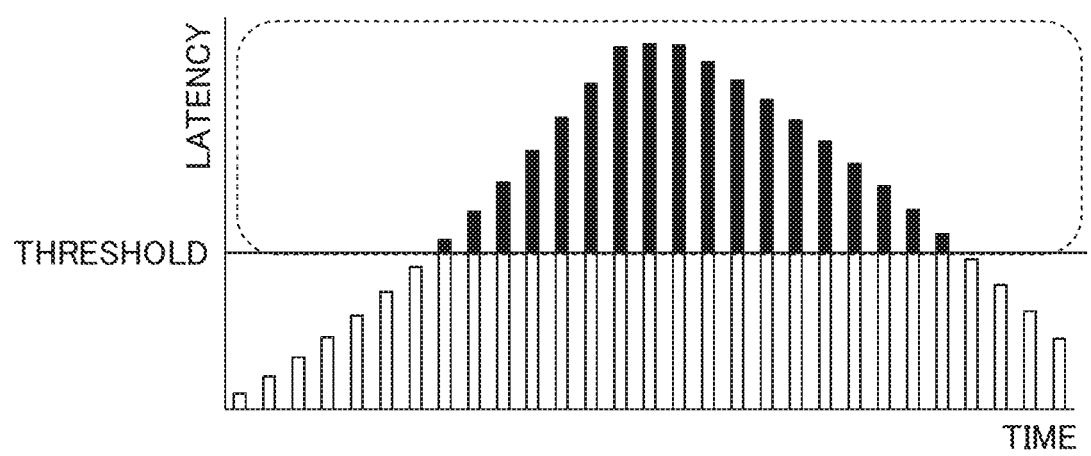
FIG. 19 is a diagram illustrating one example of evaluation value calculations.

Here, FIG. 19 is a diagram illustrating one example of evaluation value calculations. Latencies of respective times are indicated in time series as illustrated in FIG. 19 according to time-series performance information (the volume performance table 121) which is obtained from the monitor 100 and time-series predicted performance information (the predicted performance table 127) that the performance simulator 300 which will be described later predicts in regard to a volume concerned.

Accordingly, in the present embodiment, as one example of the evaluation value calculations, the optimizer 200 calculates the sum of values of parts (painted-out parts in the graph in FIG. 19) in each of which the latency exceeds the predetermined threshold value in each time series and sets the calculated value as an evaluation value of the volume concerned. In this case, that the higher the evaluation value is, the larger the latency becomes means an unfavorable state. It becomes possible for the optimizer 200 to take a time-series load fluctuation of the volume concerned into consideration by performing such evaluation value calculations. Then, as described above, the optimizer 200 rearranges the nodes and the volumes in descending order of the evaluation values in step S202 and thereby the node and the volume which are the highest in evaluation value, in other words, the node and the volume which are the highest in current load are rearranged to high-order positions.

As a supplement of the above-described evaluation value calculations, "Threshold" in FIG. 19 corresponds to a predetermined requirement for the latency (for example, SLA (Service Level Agreement) of the latency). In the evaluation value calculations in the example in FIG. 19, the latencies which exceed the requirements are decided per time-series and then the sum of the values of the latencies which exceed the requirement is calculated as the evaluation value of the latency, instead of obtaining the sum and an average of values of latencies in the whole time series all at once. In the present embodiment, it becomes possible to decide a target data migration pattern which is higher in accuracy by taking whether the latency in each time series meets the requirement into consideration by calculating a goodness value which will be described later by using the evaluation value which is calculated by such a method as mentioned above.

After execution of rearrangement of the nodes and the volumes in step S202, the optimizer 200 continues execution of the processes in step S204 to step S219 in a loop in a case where a processing time is in a predetermined specified time (step S203).

In step S204, the optimizer 200 initializes the variable "Best Move" which holds volume migration which is decided to be optimum at the current time point and sets "None".

Next, the optimizer 200 continues execution of the processes in step S206 to step S219 in the loop in a case where the viable "nodeIndex" is less than the total number of nodes (step S205). The total number of nodes is described in the number of the servers 1202 in the system configuration table 120 (see FIG. 6).

In step S206, the optimizer 200 selects the "nodeIndex"-th node which is obtained after rearrangement of the nodes and volumes in step S202 as the migration source node.

Next, the optimizer 200 designates one target volume in the volumes which are rearranged in descending order in accordance with the evaluation values of the volumes and executes loop processing of the processes in step S208 to step S215 in the loop (step S207).

In step S208, the optimizer 200 assumes that the target volume which is on the migration source node which is selected in step S206 and is designated in step S207 is to be migrated to a node which is the lowest in load in all the nodes, that is, the node which is the smallest in evaluation value.

Then, the optimizer 200 decides whether the capacity of the volume is smaller than a predetermined threshold value (step S209). This threshold value is defined by the user or the distributed storage system 1, for example, from the viewpoints as follows. In general, it is thought that a volume which is large in capacity becomes high also in load in proportion and therefore even in a case where the volume is migrated to another node, the possibility that the volume would bring the migration destination node into an overloaded state is high. In addition, since also the cost involved in migration is high, it is difficult to obtain advantages of migration. Accordingly, the optimizer 200 defines the predetermined threshold value. In step S209, in a case where the capacity of the volume is smaller than the predetermined threshold value (YES in step S209), the optimizer 200 proceeds to step S210. In a case where the capacity of the volume is larger than the predetermined threshold value (NO in step S209), the optimizer 200 skips processes in steps up to step S215 and decides to exit from a loop in step S207.

In step S210, the optimizer 200 confirms whether the migration destination node has the free capacity which is sufficient for migration of the target volume. In a case where the sufficient free capacity is present (YES in step S210), the optimizer 200 proceeds to step S211. On the other hand, in a case where the sufficient free capacity is not present (NO in step S210), the optimizer 200 decides to exit from the loop in step S207 similarly to the case of NO in step S209.

In step S211, the optimizer 200 calls the performance simulator 300. In this case, the optimizer 200 gives information which indicates the system configuration (the node configuration table 121), information which indicates provisional volume migration which is assumed in step S208 (the move volume table 125) and performance information of each volume (the volume performance table 124) to the performance simulator 300 as input. The performance simulator 300 which is called executes performance simulation processing on the basis of the respective pieces of information which are input and outputs predicted information on the performance (the predicted performance table 127) and predicted information on the resource utilization rate (the resource utilization table 126) to the optimizer 200 as a result of execution of the performance simulation processing. Details of the performance simulation processing will be described later with reference to FIG. 20.

Next, the optimizer 200 calculates evaluation values of each volume and each node in provisional volume migration on the basis of output from the performance simulator 300 (step S212).

Further, the optimizer 200 calculates the goodness value (step S213). The goodness value is obtained by subtracting the evaluation value which is obtained after migration from the evaluation value of the entire distributed storage system 1 which is obtained before migration. As described with reference to FIG. 19, the smaller the evaluation value is, the smaller the latency becomes and the higher the evaluation value becomes. Therefore, in a case where the goodness value is increased as a result of execution of the subtraction, it means that the migration is migration which is appropriate for improvement of the latency (good migration). In a case where the goodness value is decreased, it means that the migration is inappropriate migration (bad migration).

Then, the optimizer 200 decides whether the goodness value which is calculated in step S213 is increased (step S214). In a case where the goodness value is increased (YES in step S214), the optimizer 200 sets the provisional volume migration to the variable "BestMove" (step S215) and decides to exit from the loop in step S207. On the other hand, in a case where the goodness value is not increased (NO in step S214), the optimizer 200 skips the process in step S215 and decides to exit from the loop in step S207. Since a volume migration plan which is obtained in a case where a higher goodness value is calculated is set to "BestMove" by executing the loop processing in the step S207 in this way, it becomes possible to set an optimum migration plan on the migration source node (the "nodeIndex"-th node) which is being currently selected to "BestMove".

After exiting from the loop processing (step S208 to step S215) in step S207, the optimizer 200 decides whether "BestMove" id present, that is, whether migration by which the goodness value is increased is executed in the provisional volume migration in the loop processing (step S216).

In step S216, in a case where "BestMove" is present (YES in step S216), the optimizer 200 adds "BestMove" concerned to "MoveCandidate" (step S217). Although in the examples in FIG. 17 and FIG. 18, the processing is executed not on the basis of a concept that "BestMove" is searched out by searching all the patterns but on the basis of a concept that definite improvement is aimed for by setting "BestMove" as the candidate for migration ("MoveCandidate") at the time point that "BestMove" is present, the processing may be executed on the basis of the former concept. On the other hand, in a case where "BestMove" is not present in step S216 (NO in step S216), the optimizer 200 increments "nodeIndex" so as to advance the target node by one (step S218).

Then, after execution of a process in step S217 or step S218, the optimizer 200 calculates again the evaluation values of the volume and the node by taking the updated "MoveCandidate" into consideration and sorts the volumes and the nodes in descending order of the respective evaluation values (step S219).

After execution of the process in step S219, first, the optimizer 200 decides to exit from a loop in step S205. At the time point of termination of execution of the loop processing in step S205, selection of "BestMove" and addition of "BestMove" to "MoveCandidate" for all the nodes are completed. Then, at termination of execution of the loop processing in step S205, the optimizer 200 decides to exit from the loop in step S203. Then, the optimizer 200 exits from the loop processing and then terminates execution of the optimum placement decision processing.

Figure 21:
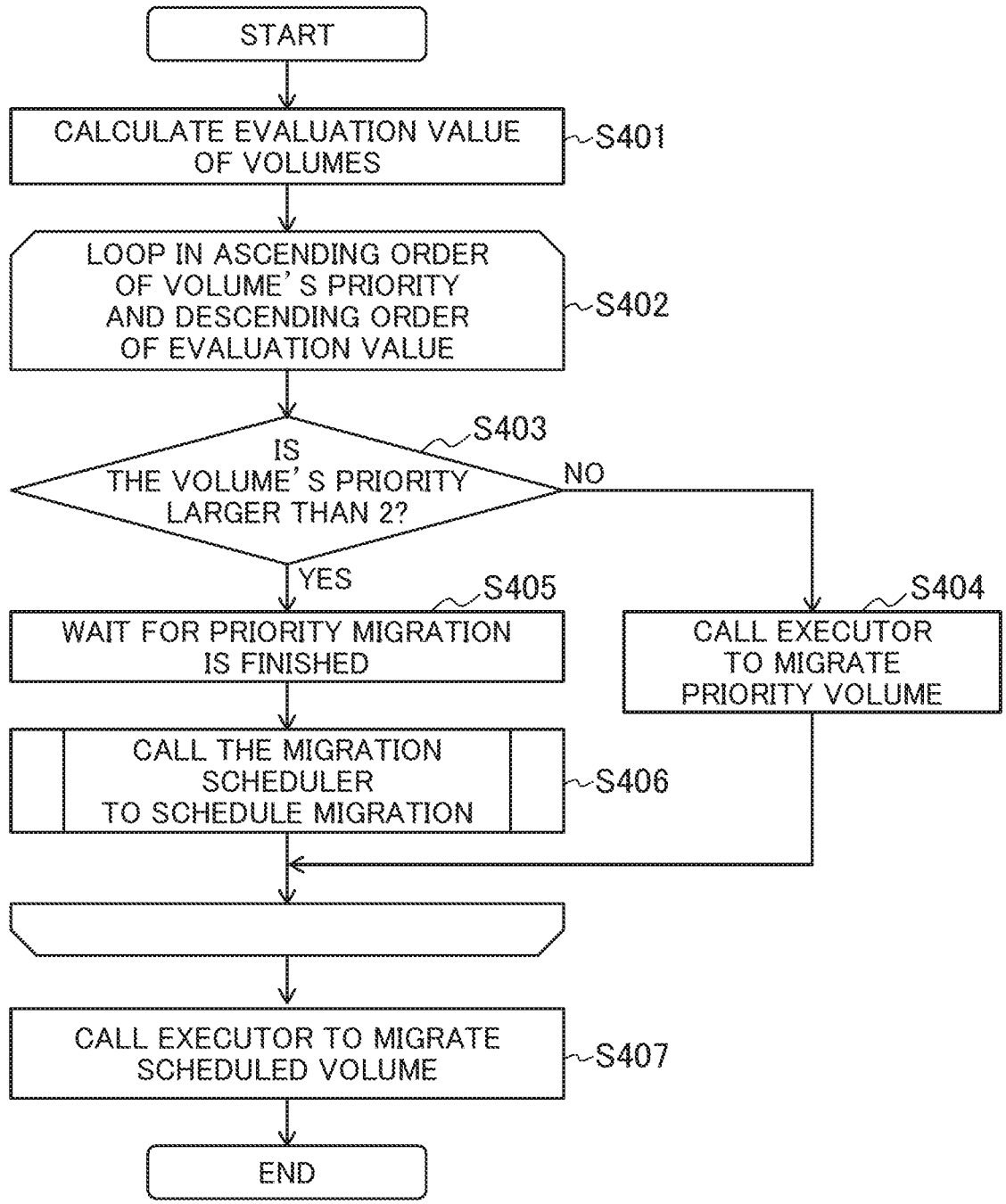
FIG. 21 is a flowchart illustrating one processing procedure example of migration decision processing.

It becomes possible for the optimizer 200 to decide the optimum placement destination of each volume in the distributed storage system 1 by repetitively searching for the placement destination of each volume in order starting from the volume which has a storage area on the node which is high in load by executing such optimum placement decision processing as above. Then, the optimizer 200 prepares the volume placement table 122 (corresponding to the second volume placement table 122 which is described before with reference to FIG. 8) which is based on a final result of sorting in step S219 and outputs the volume placement table 122 which is so prepared to the migration operator 400 as a result of execution of the optimum placement decision processing. Then, in the migration operator 400, migration decision processing which will be described in detail with reference to FIG. 21 is executed on the basis of the second volume placement table 122.

Figure 20:
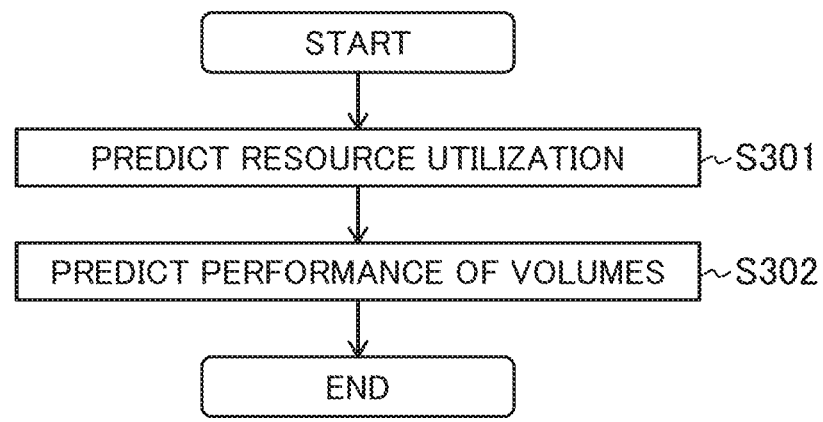
FIG. 20 is a flowchart illustrating one processing procedure example of performance simulation processing.

FIG. 20 is a flowchart illustrating one processing procedure example of performance simulation processing. The performance simulation processing which is illustrated in FIG. 20 is called from the optimizer 200 in step S211 in FIG. 18 and the performance simulator 300 executes the called performance simulation processing.

In the performance simulation processing, the performance simulator 300 calculates the predicted resource utilization rate of each resource on the basis of IOPSs (the read IOPS 1245 and the write IOPS 1246) which are described in the volume performance table 124 which is input from the optimizer 200 and further calculates the predicted latency from the calculated predicted resource utilization rate.

In FIG. 20, first, the performance simulator 300 calculates a predicted value of the resource utilization rate (step S301). The resource utilization rate has a value which is obtained by dividing each IOPS (the read IOPS 1245 and the write IOPS 1246 on the volume performance table 124) at a certain time (per time) by a maximum IOPS of each node per resource of each node. Here, it is possible to obtain the maximum IOPS of each node by using a tool which calculates an expected IOPS from a hardware specification such as a sizing toll while referring to the node configuration table 121 (see FIG. 7). The performance simulator 300 updates the resource utilization table 126 on the basis of a result of the calculation executed in step S301.

Next, the performance simulator 300 calculates the predicted value of I/O performance (the latency) from the predicted value of the resource utilization rate which is calculated in step S301 (step S302). It is thought that the I/O performance has an effect on maximum performance of the resource which is the highest in utilization rate in the respective predicted resource utilization rates. Accordingly, in step S302, the performance simulator 300 calculates the corresponding latency from the utilization rate of the resource which is the highest in utilization rate by using the latency on resource utilization table 128 and updates the predicted performance table 127 on the basis of a result of the calculation of the latency.

It becomes possible for the performance simulator 300 to get an estimate in a case where the volumes are actually placed in regard to the migration of the volume that the optimizer 200 provisionally decides. Then, the optimizer 200 performs again evaluation by reflecting a result of execution of the performance simulation processing and thereby it becomes possible for the distributed storage system. 1 according to the present embodiment to decide a more appropriate and safer volume placement plan.

FIG. 21 is a flowchart illustrating one processing procedure example of migration decision processing. The migration decision processing which is illustrated in FIG. 21 is processing that the migration operator 400 executes after the optimum placement decision processing has been executed by the optimizer 200 and the optimum volume placement plan has been decided.

In FIG. 21, first, the migration operator 400 calculates the evaluation value of the volume (step S401). Since the calculation which is made in step S401 is the same as the calculation which is made in step S202 in the optimum placement decision processing in FIG. 17, the result of the calculation which is made in step S202 in the optimum placement decision processing may be held in a table and so forth and the calculation which is to be made in step S401 may be omitted.

Next, the migration operator 400 loops the processes in step S403 to step S406 while sequentially designating the target volume on the basis of the priority (the priority 1232) of the volume is described in the volume priority table 123 and the evaluation value of the volume which is calculated in step S401 (step S402). More specifically, the migration operator 400 designates each target volume in order starting from the volume which is higher in priority than others (smaller in value of the priority 1232 than others) and in descending order of evaluated values between/among the volumes of the same priority and executes the following loop processing.

In step S403, the migration operator 400 decides whether the priority (the priority 1232) of the target volume is more than a predetermined threshold value (for example, "2"). This threshold value is used to distinguish between a high priority volume and a low priority volume and "2" is one example thereof.

In a case where the priority is less than the predetermined threshold value, that is, the priority is "1" and the target volume is the high priority volume in step S403 (NO in step S403), the migration operator 400 calls the executer 600 immediately and decides to start migration (step S404). Then, the executer 600 which is called executes migration of the target volume in accordance with the optimum volume placement plan which is decided by the optimizer 200.

It becomes possible for the migration operator 400 to immediately execute migration of the high priority volume in order to reduce a time taken until the high priority volume recovers a high-load state by deciding whether the target volume is high in priority in this way.

On the other hand, in a case where the priority is at least 2, that is, the target volume is a low priority volume in step S403 (YES in step S403), the migration operator 400 stands by for execution of processing of the target volume until migration of the high priority volume is completed (step S405).

In a case where this low priority volume is to be processed, the migration operator 400 calls the migration schedular 500 and makes the migration schedular 500 execute migration scheduling processing in order to avoid an increase in load on the entire distributed storage system 1 (step S406). Although details will be described later with reference to FIG. 21, a time at which migration of the target volume is started is decided by executing the migration scheduling processing so as to make it possible to execute migration of the target volume focusing on a time zone that the load on the distributed storage system 1 is low. The migration schedule table 129 which reflects a result of execution of the migration scheduling processing is output from the migration schedular 500.

After termination of execution of the process in step S404 or step S406, the migration operator 400 decides to exit from the loop in step S402. Then, when execution of the loop processing of all the target volumes is terminated, the migration operator 400 delivers the schedule (the migration schedule table 129) which is decided by the migration schedular 500 by executing the process in step S406 and makes the executer 600 execute the migration (step S407).

It becomes possible for the migration operator 400 to instruct execution of the migration of each node to an optimum migration destination which is decided by the optimizer 200 to the executer 600 at an appropriate timing which is set by taking the priority of each node and the load on the entire distributed storage system 1 into consideration.

FIG. 22 is a flowchart illustrating one processing procedure example of the migration scheduling processing. The migration scheduling processing which is illustrated in FIG. 22 is called from the migration operator 400 in order to decide the time at which migration of the low-priority volume (the target volume in the migration scheduling processing) in step S406 in FIG. 21 and the migration schedular 500 executes the migration scheduling processing.

In FIG. 22, first, the migration schedular 500 sets "None" to the variable "BestTime" which is used to indicate the optimum migration start time and sets 0 to the badness value as initialization processing (step S501).

Next, the migration schedular 500 calculates a time which is required for execution of the migration from the size of the target volume (step S502). The migration is to be executed at a constant rate by limiting the rate, for example, in such a manner that the migration is executed at a rate which is less than 10% of a bandwidth of the network by taking influence of the rate on the IO performance into consideration.

Next, the migration schedular 500 starts execution of the loop processing of the processes in step S504 to step S509 along the time series (step S503). Specifically, the migration schedular 500 prepares, for example, a plurality of candidates for the start time for a predetermined period ranging from the present to the future and executes the loop processing while selecting a target time in order starting from the time which is near the current time.

In step S504, the migration schedular 500 provisionally sets so as to start the migration at a target time which is selected in step S503.

Next, the migration schedular 500 predicts the resource utilization rate (step S505). Here, it is possible to make a predictive calculation by the same method as that in step S301 in the performance simulation processing in FIG. 20.

Next, the migration schedular 500 calculates a predicted latency from a predicted value of the resource utilization rate which is calculated in FIG. 505 (step S506). Here, it is possible to make the predictive calculation by the same method as that in step S302 of the performance simulation processing in FIG. 20.

Next, the migration schedular 500 calculates the badness value (step S507). The badness value is a value which is obtained by subtracting the evaluation value of the entire distributed storage system 1 obtained when the migration is not yet executed from the evaluation value of the entire distributed storage system 1 which is obtained in a case where the migration is executed at the target time. The badness value indicates that the most effective scheduling is executed when the badness value is set to a minimum value "0", that is, when scheduling that the evaluation value is not increased is executed.

Next, the migration schedular 500 decides whether the badness value which is calculated in step S507 is deceased (step S508). When thinking in the same way as that in decision whether the goodness value is increased in step S214 in FIG. 18, the badness value becomes positive (appropriate) in a case where the evaluation value of the entire distributed storage system 1 is decreased and becomes negative (inappropriate) in a case where the evaluation value of the entire distributed storage system 1 is decreased.

Then, in a case where the badness value is decreased in step S508 (YES in step S508), the migration schedular 500 sets the current target time to "BestTime" (step S509) and decides to exit from a loop in step S503. On the other hand, in a case where the badness value is not decreased in step S508 (NO in step S508), the migration schedular 500 skips step S509 and decides to exit from the loop in step S503.

The migration schedular 500 repeats execution of the loop processing to the last while changing the target time to be selected along the time series until exiting from the loop in step S503. As a result, a time at which a finally obtained badness value is the smallest means an optimum start time at which the load which is applied to the entire distributed storage system 1 is the smallest in a case where the migration is executed in the predetermined time period which would become a target of the start time and this badness value is finally set to "BestTime".

Then, after termination of execution of the loop processing in step S503, the migration schedular 500 records the final "BestTime" onto a migration start time 1292 of the migration schedule table 129, outputs the migration schedule table 129 to the migration operator 400 and then terminates execution of the migration scheduling processing.

As described above, in the data migration processing, the distributed storage system 1 according to the present embodiment records the information on the usages of the plurality kinds of respective resources (for example, the CPU, the memory, the drive, the network and so forth) in the predetermined period of time per data (volume), estimates the usage of the migration destination node which would be obtained when each piece of data is migrated by using the information on the usages of the respective resources, calculates the latency from the estimated usage and seeks out the optimum data migration on the basis of the calculated latency. According to the distributed storage system 1 which operates in this way, it becomes possible not only to appropriately judge the component which would become the bottleneck by comprehensively judging the usages of the plurality of kinds of resources but also to accurately decide the migration pattern of the target data in consideration of the influence of the data migration on the respective resources. That is, it becomes possible to decide a safe migration pattern of the target data not only by calculating the optimum placement plan which is based on the monitored load, but also by getting an estimate of a case where the volumes are actually placed and reflecting a result of estimation on the placement plan.

Further, according to the distributed storage system 1 pertaining to the present embodiment, the per-resource usage is recorded at a plurality of time points in the time series by execution of the monitoring processing and whether the latency which is estimated by execution of the performance simulation processing at each time point meets the predetermined requirement (for example, the SLA) in the optimum placement decision processing and thereby it becomes possible to decide a more accurate target data migration pattern in consideration of the judgment which is made at each time point instead of average judgement.

In addition, according to the distributed storage system 1 pertaining to the present embodiment, in a case where the target data of the data migration is the low-priority volume, a migration timing is controlled in consideration of an increase in pe-resource usage due to data migration by execution of the migration scheduling processing and thereby it becomes possible to avoid occurrence of abnormality of the latency caused by migration load.

In addition, according to the distributed storage system 1 pertaining to the present embodiment, in a case where a trouble occurs while the data migration is being executed, the monitor 100 issues the alert and the executor 600 suppresses the transfer rate of the migration and thereby it becomes possible to execute safer migration.

Incidentally, all or some of the respective configurations, functions, processing units, processing sections and so forth in the above-described embodiment may be realized by hardware, for example, by designing all or some of them by an integrated circuit and/or other methods. In addition, all or some of the respective configurations, functions and so forth may be realized by software by interpreting and executing a program which realizes the respective functions by the processor. Pieces of information such as programs, tables, files and so forth which are used to realize the respective functions may be stored into (recorded onto) storage devices such as a memory, a hard disc, an SSD (Solid State Drive) and so forth and/or recoding (storage) media such as an IC (Integrated Circuit) card, an SD (Secure Digital) card, a DVD (Digital Versatile Disc) and so forth.

In addition, control lines and information lines which are thought to be necessary for description of the invention are illustrated in the drawings and all the control lines and information lines are not necessarily illustrated in the drawings from the viewpoint of products. It may be thought that almost all the configurations are mutually connected in fact.

What is claimed is:

1. A distributed storage system comprising:
   a plurality of nodes which are connected with one another over a network, have processors and memories individually and thereby provide a volume into/from which a host system inputs/outputs data; and a storage medium which stores the data which is input into/output from the volume, wherein the processor of any one of the nodes acquires a per-period usage of each of a plurality of kinds of resources per data, estimates a per-period usage of each resource on a migration destination node when the data is migrated to the migration destination node by using the acquired per-data resource usage and calculates an estimate of a latency from the estimated usage of each resource, and decides a migration pattern of the data on the basis of the estimate of the latency;

wherein the processor acquires the input/output together with characteristics of the input/output, and calculates a usage of each resource by the input/output on the basis of the characteristics of the input/output;

wherein types of the input/output, that is, read input/output and write input/output are included in the characteristics of the input/output.

2. The distributed storage system according to claim 1, wherein types of the input/output, that is, random input/output and sequential input/output are included in the characteristics of the input/output.

3. The distributed storage system according to claim 1, wherein each node has the storage medium which stores the data, and migration of the data between/among the nodes includes migration of the data between/among the storage media.

4. The distributed storage system according to claim 1, wherein the processor, the memory, the network and/or the storage medium are included in the resources whose usages are estimated.

5. The distributed storage system according to claim 1, wherein the processor in a case where migration of the data is to be decided, decides an execution timing of migration of the data on the basis of the estimate of the per-period usage of each resource on the node which is taken for migration of the data.

6. A data migration method in a distributed storage system which includes a plurality of nodes which are connected with one another over a network, have the processors and memories individually and thereby provide a volume into/from which a host system inputs/outputs data and a storage medium which stores the data which is input into/output from the volume, comprising the steps of:

acquiring a per-period usage of each of a plurality of kinds of resources per data by the processor of any one of the nodes;

estimating a per-period usage of each resource on the migration destination node when the data is migrated to the migration destination node by using the acquired per-data resource usage and calculating an estimate of a latency from the estimated usage of each resource by the processor of any one of the nodes; and deciding a migration pattern of the data on the basis of the estimate of the latency by the processor of any one of the nodes;

wherein the processor acquires the input/output together with characteristics of the input/output, and calculates a usage of each resource by the input/output on the basis of the characteristics of the input/output;

wherein types of the input/output, that is, read input/output and write input/output are included in the characteristics of the input/output.

7. The data migration method according to claim 6, wherein types of the input/output, that is, random input/output and sequential input/output are included in the characteristics of the input/output.

8. The data migration method according to claim 6, wherein each node has the storage medium which stores the data, and migration of the data between/among the nodes includes migration of the data between/among the storage media.

9. The data migration method according to claim 6, wherein the processor, the memory, the network and/or the storage medium are included in the resources whose usages are estimated.

10. The data migration method according to claim 6, wherein the processor in a case where migration of the data is to be decided, decides an execution timing of migration of the data on the basis of the estimate of the per-period usage of each resource on the node which is taken for migration of the data.

* * * * *